United States Patent [19]
Thenot

[11] 3,826,003
[45] July 30, 1974

[54] FALSE TOOTH CONSTRUCTION
[75] Inventor: Raymond Thenot, Hamilton, Ohio
[73] Assignee: Bales Jewelry, Inc., Fairfield, Ohio
[22] Filed: Mar. 12, 1973
[21] Appl. No.: 340,093

[52] U.S. Cl. .................................................. 32/8
[51] Int. Cl. ........................................... A61c 13/00
[58] Field of Search ....................... 63/2; 32/2, 8, 10

[56] References Cited
UNITED STATES PATENTS
1,349,102   8/1920   Robinson ............................ 63/29 R
2,756,572   7/1956   Yeager et al. ........................... 63/26

OTHER PUBLICATIONS
The Washington Post, pp. E10–E11, Teeth inlaid with Turquoise and Jade, Mar. 18, 1973.

Primary Examiner—Robert Peshock
Attorney, Agent, or Firm—Wood, Herron & Evans

[57] ABSTRACT

A false tooth construction that incorporates a jewel in combination with the tooth. The tooth is provided with a hole therethrough from the tooth's front face to the tooth's rear face, the hole having a cross-sectional configuration that generally conforms with the peripheral configuration of the jewel's girdle. An annular recess, concentric with the hole, is provided interiorly of the tooth adjacent the front face thereof. The jewel's girdle is seated in the annular recess, the jewel's table thereby being located substantially flush with the tooth's front face since the recess is adjacent the front face. A clear filler material is used to fill up the hole in the tooth between the jewel and the tooth's rear face once the jewel is seated in the annular recess. This mechanically locks the jewel in its recess because the hole's cross-sectional area lessens throughout its axial length from the tooth's front face to the tooth's rear face. Further, the clear filler allows light to pass through the jewel for giving it visual brilliance 2 Claims, 3 Drawing Figures

PATENTED JUL 30 1974 3,826,003

FALSE TOOTH CONSTRUCTION

This invention relates to dentistry and, more particularly, this invention relates to a specific false tooth construction.

As is well known, dentistry is that part of medical science which is concerned with the prevention, diagnosis, and treatment of diseases of the teeth and adjacent tissues, as well as with the restoration of missing dental structures. Prosthodontia is that branch of dentistry devoted to the construction and replacement of oral structures with artificial substitutes.

In the human dentition the teeth shape differ in shape and function. They are specialized to perform different aspects of their masticatory function. Incisors cut and saw the food, cuspids and bicuspids seize and tear it, and molars grind or pulverize it. Anatomically, each live or natural tooth consists of a crown and a root. The root is embedded within a bony socket of the jaw and supports the crown in its masticatory function. However, a false tooth is provided with no root whatsoever (since it is mechanically linked or connected with the oral cavity by dentures or bridges as explained below).

The replacement of one or more teeth in a person's oral cavity is necessitated either by congenital defects of the teeth or by loss of the teeth due to extraction, surgery, accident or disease. Replacement or false teeth may be provided for a person's oral cavity by dentures or by bridges. Dentures are either partial or complete, the former being used when some teeth are present and the latter being used when all the natural teeth are missing. Bridges are used where there are natural teeth present at each end of the missing space to support the prosthesis. While dentures are removable, bridges may be fixed or removable depending upon the position and strength of the supporting teeth, and other pertinent factors. The tooth crowns provided in dentures and bridges may be fabricated of any of a number of different materials, but are commonly fabricated from either porcelain or plastic when a white tooth similar to a natural tooth is desired by a wearer. However, it is not uncommon to provide one or more gold teeth in a denture or bridge.

Both the upper and lower sets of a person's teeth are each provided with incisors, cuspids, bicuspids and molars. However, when a person smiles, it is the incisors of the upper jaw which are particularly visible. This for the reason that the person's upper lip tends to be raised when muscles of the face transform the facial profile into a smile, thereby exposing the upper jaw incisors. A smile particularly exposes the upper jaw's main front incisors (commonly known as the two front teeth) to view.

It has been one objective of this invention to provide a jewel in combination with, particularly, an upper jaw incisor, for those persons desiring to provide a different facial appearance when smiling.

It has been another objective of this invention to provide a jewel in combination with, particularly, an upper jaw incisor fabricated of porcelain while providing as much light to the jewel as possible for enhancing its brilliance.

The objectives of this invention have been attained by providing a hole through a false tooth from the tooth's front face to the tooth's rear face, the hole having a cross-sectional configuration that generally conforms with the peripheral configuration of the jewel's girdle. An annular recess, concentric with the hole, is provided interiorly of the tooth adjacent the front face thereof. The jewel's girdle is seated in the annular recess, the jewel's table thereby being located substantially flush with the tooth's front face since the recess is adjacent the front face. A clear filler material is used to fill up the hole in the tooth between the jewel and the tooth's rear face once the jewel is seated in the annular recess. This mechanically locks the jewel in its recess because the hole's cross-sectional area lessens throughout its axial length from the tooth's front face to the tooth's rear face. Further, the clear filler allows light to pass through the jewel for giving it visual brilliance.

Other objectives and advantages of this invention will be more apparent from the following detailed description taken in conjunction with the drawings in which.

Figure 1:
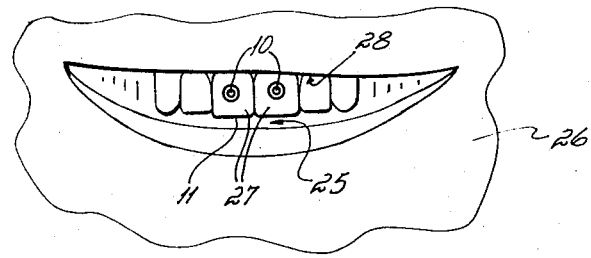
FIG. 1 is a front view of a person's mouth in a smile attitude, the smile exposing diamonds set in the two front incisors of the person's upper jaw.
Figures 2, 3:
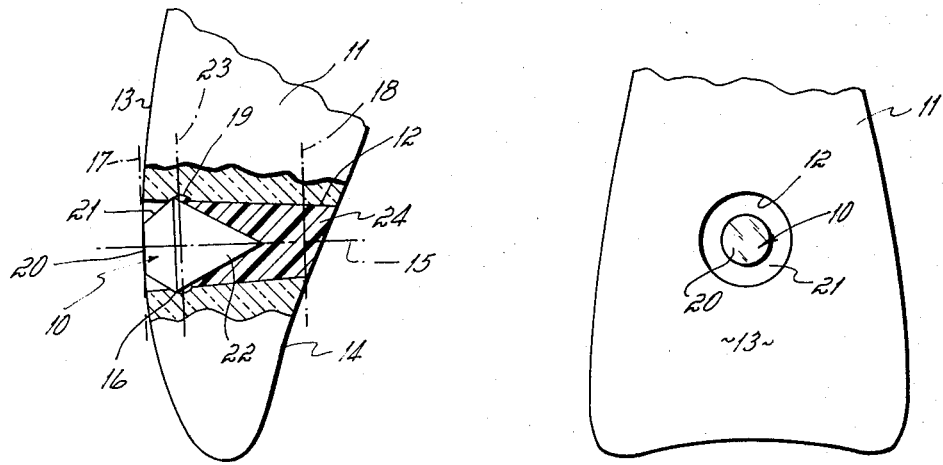
FIG. 2 is a cross-sectional view of a porcelain false tooth having a diamond mounted therein.
FIG. 3 is a front view of the false tooth illustrated in FIG. 2.

As shown in FIG. 1, the false tooth construction of this invention includes a jewel, e.g., a round or brilliant cut diamond 10, set in a false tooth 11 fabricated of, e.g., porcelain. A hole 12 is provided through the false tooth 11 from the tooth's front face 13 to the tooth's rear face 14. As shown in FIGS. 2 and 3, the hole 12 is of a circular cross section throughout its length along its axis 15, this cross-sectional configuration conforming with the peripheral configuration of the diamond's girdle 16. Note that the hole's cross-sectional area lessens throughout the length of its axis 15, the major cross-sectional area (as measured in a plane 17 transverse to the axis) being at the front face 13 of the tooth and the minor cross-sectional area (also as measured in a plane 18 transverse to the axis) being adjacent the rear face of the tooth. Thus, the hole 12 is in the nature of a frusto-cone with the cone's major diameter being at the tooth's front face 13 and the cone's minor diameter being at the tooth's rear face 14 as those diameters are measured transverse to the axis 15 of the hole.

Seat means in the form of an annular recess 19 is provided about the hole 21 closely adjacent the front face 13 of the tooth 11 and interiorly of the tooth, the annular recess being located in a plane 23 parallel to the tooth's front face 13. The annular recess 19 is adapted to receive the round diamond 10 in seated relation therein, the recess being located so as to position the table 20 of the diamond in substantially coplanar relation with the tooth's front face 13 when the diamond is seated in the recess. That is, since the hole's annular recess 19 is in a plane 23 substantially parallel to the plane of the tooth's front face 13, the diamond's table 20 is located in a plane parallel to and coplanar with the tooth's front face when the diamond 10 is finally seated within the tooth. The recess 19 defined in the tooth aids in mechanically or structurally holding the diamond 10 in seated relation inside the tooth since the diameter of the tooth's hole 12 itself, in the plane 23 of the recess, is less than the diameter of the diamond's girdle 16. Thus, the annular recess 19 serves as a seat for the diamond 10, the diamond's girdle 16 being embraced by that recess when the diamond is seated therein so as to aid in holding the diamond in functional relation with the tooth 11. This exposes the diamond's crown 21 and table 20 to view from the front face 13 of the tooth 11 (the diamond's pavilion 22, of course, extends into the tooth's interior toward the rear face 14 of the tooth).

That portion of the hole 12 extending rearwardly of the annular recess 19, after the diamond 10 has been seated in the recess, is provided with a filling 24 that hardens into a clear or transparent material. Because the hole's cross-sectional area lessens from the recess's plane 23 to the rear face's plane 18, i.e., because the hole 12 is conical with the minor diameter being provided at the rear face of the tooth 11, once the filling 24 hardens in place it tends to act as a mechanical lock which holds the diamond 11 in place because the filling cannot fall out of the tooth. Of course, the diamond 10 cannot fall out of the front face 13 of the tooth 11 either because it is seated within the annular recess 19 provided interiorly of the tooth.

Transparency of the filling 24 is desired so as to allow the light available in the user's oral cavity 25 to pass through the diamond's pavilion, thereby promoting the diamond's brilliance when the user 26 smiles. If the filling 24 was translucent, minimal light would shine through the diamond 10 and adversely affect its brilliance; of course, if the filling was opaque, no light whatsoever would shine through. The transparent filling 24 must harden to a sufficient degree so that use of the tooth 11 in the usual masticatory manner may be carried out by the person 26 wearing the false tooth. Further, the filling 24 must not be effected throughout a reasonable temperature range as the user will want to drink hot coffee as well as eat cold ice cream, i.e., the coefficient of expansion and coefficient of contraction for the transparent filling 24 material must closely match those coefficients for the false tooth 11 itself so that the filling does not fall out of place, i.e., so that the diamond 10 does not fall out and become lost.

It is preferred that the diamond 10 be set in one of the two front incisors 27 of a person's upper jaw 28 for the reason that these are the teeth most visible when a person smiles. It is preferred that the false tooth 11 be a porcelain tooth for the reason that a porcelain tooth has a much longer useful life than a plastic tooth, i.e., a plastic tooth wears down over a relatively short period of time. Further, and when a porcelain false tooth 11 is used, it is highly preferred that an ultra-high speed diamond drill be used to form the hole 12. High-speed diamond drills are commonly used by dentists and dental laboratories for preparing teeth for inlays, rests for partial dentures, and the like. A metal drill used on a porcelain tooth may well cause the tooth to crack and/or splinter. The preferred filling 24, i.e., the transparent filling, is a self-curing acrylic that is poured or cast into the tooth's hole when in liquid form and thereafter allowed to cure to final hardness. A preferred filling 24 substance is sold under the trademark COE-CURE by Coe Laboratories, Inc., Chicago, Ill.

A round or brilliant cut diamond 10 is the stone that has been shown in combination with a false tooth 11 in this application. The diamond need not be of a round cut but may be of a pear-shaped cut, an emerald cut, a marquise cut or an oval cut. It will be understood, however, that if either of these latter four type diamond cuts are used, the cross-sectional configuration of the hole formed in the false tooth preferably will be changed to match the periphery of the diamond's girdle as to that cut being used. Further, and although this application has discussed the mounting of diamonds in false teeth, it will be understood that other stones or jewels such as emeralds, rubies or sapphires, as well as semi-precious stones or non-precious stones, may be mounted in accordance with this invention.

Having described in detail the preferred embodiment of my invention, what I desire to claim and protect by letters Patent is:

1. A false tooth construction comprising
   a whole false tooth fabricated of porcelain,
   structure defining a hole in said porcelain false tooth, said hole being provided therethrough from said tooth's front face to said tooth's rear face, and said hole being of a frusto-conical shape where the major diameter of said hole is in a plane transverse to the hole's axis at said tooth's front face and the minor diameter thereof is in a plane transverse to the hole's axis adjacent said tooth's rear face,
   seat means provided interiorly of said tooth within said hole and located adjacent said tooth's front face, said seat means being annular about said hole and concentric therewith,
   a stone seated within said hole on said seat means, said stone being visible from the front face of said tooth, and said hole being of a cross-sectional configuration that generally conforms with the peripheral configuration of said stone's girdle, and
   a clear filling provided in said hole between said stone and said tooth's rear face, said filling cooperating with said seat means to hold said stone in assembled relation with said tooth, said filling being transparent and providing a smooth contour flush with said tooth's rear face.

2. A false tooth construction as set forth in claim 1 wherein said stone is a diamond.

* * * * *